United States Patent
Sogabe et al.

(10) Patent No.: US 9,254,801 B2
(45) Date of Patent: Feb. 9, 2016

(54) FRONT VEHICLE-BODY STRUCTURE OF VEHICLE

(71) Applicant: MAZDA MOTOR CORPORATION, Hiroshima (JP)

(72) Inventors: Hiroshi Sogabe, Aki-gun (JP); Masatoki Kito, Hiroshima (JP); Hirofumi Takada, Higashihiroshima (JP); Tsutomu Watanabe, Hiroshima (JP); Arihiro Furumoto, Hiroshima (JP); Ryuma Murakami, Hiroshima (JP); Takayuki Nakamae, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/525,825

(22) Filed: Oct. 28, 2014

(65) Prior Publication Data

US 2015/0158445 A1    Jun. 11, 2015

(30) Foreign Application Priority Data

Dec. 5, 2013 (JP) .................... 2013-251701

(51) Int. Cl.
*B60R 19/54* (2006.01)
*B60R 21/34* (2011.01)
*B62D 25/08* (2006.01)
*B60R 19/12* (2006.01)

(52) U.S. Cl.
CPC ............. *B60R 19/54* (2013.01); *B60R 19/12* (2013.01); *B60R 21/34* (2013.01); *B62D 25/082* (2013.01)

(58) Field of Classification Search
CPC ....... B60R 19/34; B60R 19/54; B62D 25/082
USPC ................................... 296/187.04
See application file for complete search history.

(56) References Cited

U.S. PATENT DOCUMENTS

| | | | |
|---|---|---|---|
| 8,287,036 B2 * | 10/2012 | Nakaura et al. | 296/203.02 |
| 2006/0125250 A1 * | 6/2006 | Evans | 293/121 |
| 2010/0052342 A1 * | 3/2010 | Wurtemberger | 293/132 |
| 2011/0062750 A1 * | 3/2011 | Nakaura et al. | 296/187.09 |
| 2012/0019027 A1 * | 1/2012 | Tashiro et al. | 296/193.09 |
| 2015/0001863 A1 * | 1/2015 | Cha et al. | 293/120 |
| 2015/0054306 A1 * | 2/2015 | Kito et al. | 296/187.04 |
| 2015/0054307 A1 * | 2/2015 | Kito et al. | 296/187.04 |

FOREIGN PATENT DOCUMENTS

JP    2011-063096 A    3/2011

* cited by examiner

*Primary Examiner* — Jason S Morrow
(74) *Attorney, Agent, or Firm* — Studebaker & Brackett PC

(57) ABSTRACT

A protecting member comprises a pair of right-and-left brackets extending obliquely downward and forward from front portions of a pair of right-and-left side frames and a stiffener extending in a vehicle width direction below a bumper beam and attached to front ends of the brackets. The stiffener has a closed cross section extending in the vehicle width direction, and an upper face of its central portion in the vehicle width direction has a concaved portion. A lower face of the stiffener extends horizontally substantially straightly. It is preferable that the closed cross section of the central portion of the stiffener be configured such that its vertical distance is relatively small and its longitudinal width is relatively large, compared with the other part of the stiffener.

6 Claims, 6 Drawing Sheets

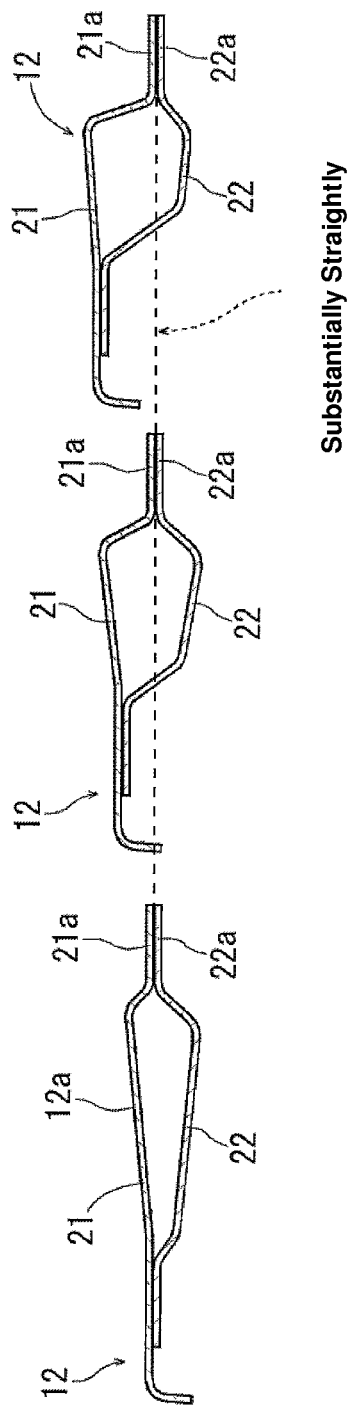

FRONT VEHICLE-BODY STRUCTURE OF VEHICLE

BACKGROUND OF THE INVENTION

The present invention relates to a front vehicle-body structure of a vehicle.

An automotive vehicle as vehicles comprises a pair of right-and-left side frames extending longitudinally at a front portion of a vehicle body and a bumper beam extending in a vehicle width direction and attached to front ends of the pair of right-and-left side frames. Further, the automotive vehicle comprises a protecting member including a stiffener (which may be called a lower bumper beam) which extends in the vehicle width direction below the bumper beam in order that when the vehicle collides with an obstacle, particularly a leg portion of a pedestrian, the obstacle (pedestrian's leg portion) is restrained from coming in below a vehicle-body front portion.

Japanese Patent Laid-Open Publication No. 2011-063096 discloses a stiffener which is configured such that its central portion in the vehicle width direction is stepwise partially low so as to ensure a large opening area of a radiator opening formed at a vehicle's front end. This stiffener is configured in an elevational view to comprise a central horizontal portion horizontally extending substantially straightly at a low level, a pair of vertical portions rising upward substantially vertically from both-side ends of the central horizontal portion, and an end-portion horizontal portion horizontally extending substantially straightly outward in the vehicle width direction from each upper end of the vertical portions.

A shape of the stiffener of the above-described patent document is preferable in ensuring the large opening area of the radiator opening. However, since this stiffener has plural step portions which bend substantially at a right angle in the elevational view, it may be necessary to make its plate thickness considerably large (i.e., thick) to ensure a sufficient strength of the step portions, so that the weight of the stiffener may become unavoidably heavy. Accordingly, some countermeasures have been desired in this regard.

SUMMARY OF THE INVENTION

The present invention has been devised in view of the above-described matter, and an object of the present invention is to provide a front vehicle-body structure of a vehicle which can meet both requirements of ensuring the large opening area of the radiator opening and ensuring the sufficient strength without increasing the weight on a high level.

According to the present invention, there is provided a front vehicle-body structure of a vehicle, comprising a pair of right-and-left side frames extending longitudinally at a front portion of a vehicle body, a bumper beam extending in a vehicle width direction and attached to front ends of the pair of right-and-left side frames, a pair of right-and-left brackets attached to the pair of right-and-left side frames or a suspension cross member attached to the pair of right-and-left side frames and extending obliquely downward and forward, and a stiffener extending in the vehicle width direction, arranged below the bumper beam, and attached to front ends of the pair of right-and-left brackets, wherein the stiffener has a closed cross section extending in the vehicle width direction substantially over an whole length thereof and is configured in an elevational view such that an upper face of a central portion thereof in the vehicle width direction is concaved and a lower face thereof extends horizontally substantially straightly, and the central portion, in the vehicle width direction, of the stiffener is configured such that a distance between the upper face and the lower face thereof is relatively small and a longitudinal width thereof is relatively large, compared with the other part of the stiffener.

According to the present invention, since the upper face of the central portion, in the vehicle width direction, of the stiffener is concaved, the large opening area of the radiator opening can be ensured. Further, since the lower face of the stiffener is configured to extend horizontally substantially straightly and the central portion, in the vehicle width direction, of the stiffener is configured such that the distance between the upper face and the lower face thereof is relatively small and the longitudinal width thereof is relatively large, compared with the other part of the stiffener, the sufficient strength of the stiffener can be ensued by adopting the closed-cross section structure, without increasing the whole weight. Particularly, since the area of the cross section of the closed-cross section portion in the vehicle width direction is configured not to decrease too excessively, even if the weight of the stiffener is light, the opening area of the radiator opening can be properly large and also the deformation load at the respective portions over the whole width, in the vehicle width direction, of the stiffener can be substantially constant by ensuring the specified strength at the shape-changing portion of the stiffener.

According to an embodiment of the present invention, the stiffener comprises an upper-side member and a lower-side member which are joined together to form the closed cross section thereof, respective rear flange portions of the upper-side and lower-side members which are formed at respective rear portions of the upper-side and lower-side members and joined to each other, and a joint portion of the respective rear flange portions of the upper-side and lower-side members is configured in a back view to extend horizontally substantially straightly. Since the rear flange portions are configured to extend horizontally substantially straightly, this embodiment is preferable in increasing the strength of the stiffener as well as achieving the light weight of the stiffener.

According to another aspect of the present invention, there is provided a front vehicle-body structure of a vehicle, comprising a pair of right-and-left side frames extending longitudinally at a front portion of a vehicle body, a bumper beam extending in a vehicle width direction and attached to front ends of the pair of right-and-left side frames, a pair of right-and-left brackets attached to the pair of right-and-left side frames or a suspension cross member attached to the pair of right-and-left side frames and extending obliquely downward and forward, and a stiffener extending in the vehicle width direction, arranged below the bumper beam, and attached to front ends of the pair of right-and-left brackets, wherein the stiffener has a closed cross section extending in the vehicle width direction substantially over an whole length thereof and is configured in an elevational view such that an upper face of a central portion thereof in the vehicle width direction is concaved and a lower face thereof extends horizontally substantially straightly, and the stiffener comprises an upper-side member and a lower-side member which are joined together to form the closed cross section thereof, respective rear flange portions of the upper-side and lower-side members which are formed at respective rear portions of the upper-side and lower-side members and joined to each other, and a joint portion of the respective rear flange portions of the upper-side and lower-side members is configured in a back view to extend horizontally substantially straightly.

According to this aspect of the present invention, since the upper face of the central portion, in the vehicle width direction, of the stiffener is concaved, the large opening area of the radiator opening can be ensured. Further, since the lower face of the stiffener is configured to extend horizontally substantially straightly and the joint portion of the rear flange portions is configured to extend horizontally substantially straightly, the sufficient strength of the stiffener can be ensued by adopting the closed-cross section structure, without increasing the whole weight.

According to another embodiment of the present invention, the closed cross section of the stiffener is configured such that a longitudinal width of the central portion, in the vehicle width direction, of the stiffener is relatively large, compared with the other part of the stiffener. This embodiment is preferable in ensuring the sufficient rigidity by having the properly-large longitudinal-width as well as the properly-small distance between the upper and lower faces at the central portion in the vehicle width direction and also in making the deformation load at the respective portions over the whole width of the stiffener substantially constant.

Other features, aspects, and advantages of the present invention will become apparent from the following description which refers to the accompanying drawings.

BRIEF DESCRIPTION OF THE DRAWINGS

FIGS. 7A, 7B, 7C are sectional views taken along lines X7A-X7A, X7B-X7B, and X7C-X7C of FIG. 6, respectively, which show joint positional relationships of respective rear flange portions.

DETAILED DESCRIPTION OF THE INVENTION

Hereinafter, a preferred embodiment of the present invention will be described referring to the accompanying drawings.

Figure 1:
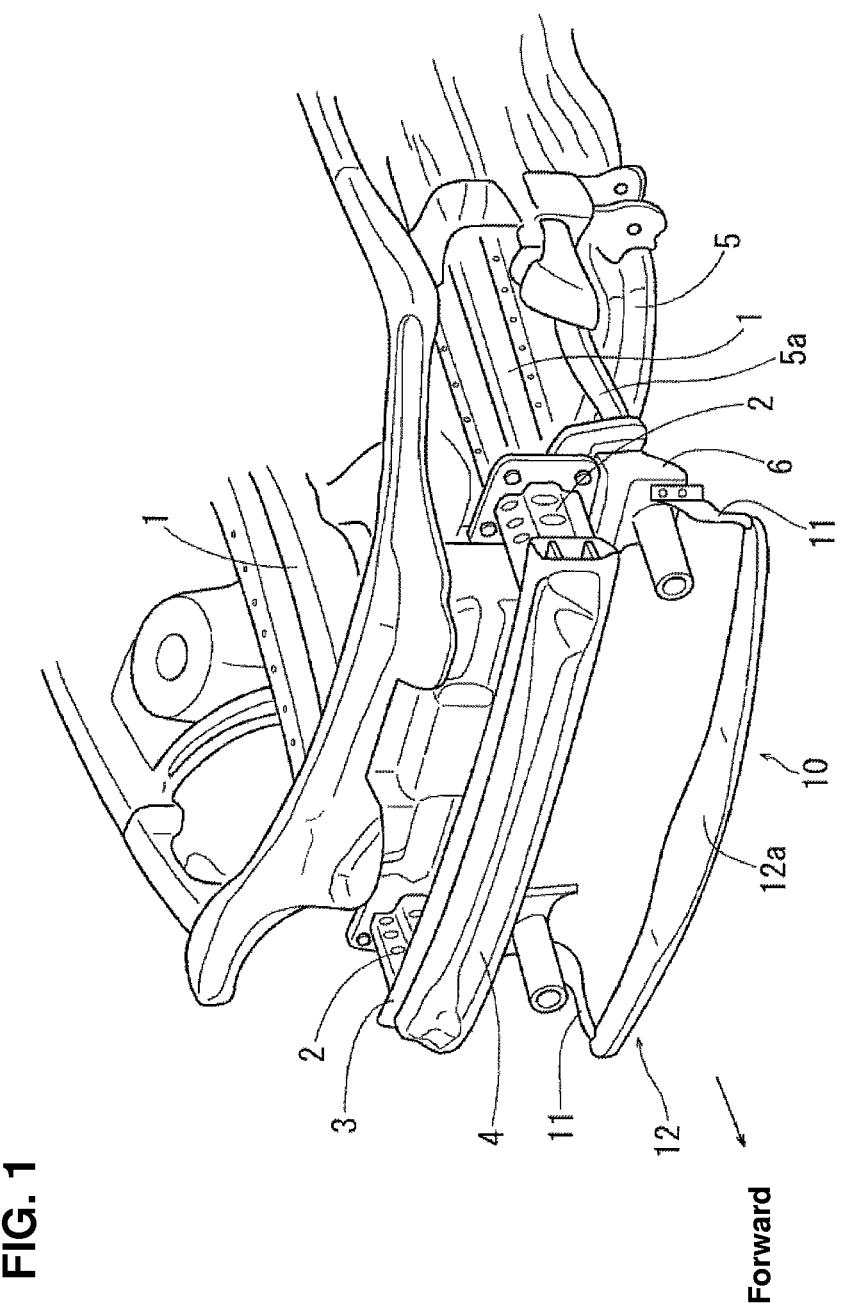
FIG. 1 is a perspective view showing an example of a front vehicle-body structure of a vehicle to which the present invention is applied.

A reference character 1 in FIG. 1 which shows a front vehicle-body structure of a vehicle denotes a side frame (front side frame) as a vehicle-body reinforcing member which extends longitudinally. A crash can 2 is attached to a front end of the side frame 1. A bumper beam 3 as a reinforcing member which extends in a vehicle width direction is attached to a pair of right-and-left crash cans 2. An energy absorbing member 4 which extends in the vehicle width direction is attached to a front face of the bumper beam 3. The energy absorbing member 4 is made from synthetic resin, for example. A reference character 5 in FIG. 1 denotes a suspension cross member (suspension frame) which is attached to a pair of right-and-left side frames 1.

An upper end of a bracket 11 is attached to a front portion of the side frame 1 via a set plate 6 as a reinforcing member. In the embodiment, a front extension portion 5a is provided to extend forward from a side end portion of the suspension cross member 5 along the side frame 1, and the set plate 6 is also connected to a front end of the front extension portion 5a (see FIG. 2 as well). The bracket 11 is made of a Fe-based metal plate, for example. The bracket 11 is configured to extend obliquely downward and forward. And, a longitudinally-extending portion of the bracket 11 is configured such that a vertical width thereof becomes gradually smaller toward the front.

Respective front end portions (lower end portions) of the pair of right-and-left brackets 11 are interconnected by a stiffener 12 which extends in the vehicle width direction. The stiffener 12 is configured to have a closed cross section extending in the vehicle width direction, and made of upper-and-lower two sheets of Fe-based metal plates, for example. The brackets 11 and the stiffeners 12 are joined together by spot welding, for example (upper-and-lower two joint points in the embodiment). Joint portions are shown specifically in FIG. 3.

The stiffener 12 is arranged at the level below the bumper beam 3 so that an upper space above the stiffener 12 can be a radiator opening. The stiffener 12 having the closed cross section is configured to slant such that its front portion goes down gradually and a front end of the front portion thereof bends downward at an angle of about 90 degrees (see FIGS. 7A, 7B and 7C). Herein, a protecting member for pedestrians 10 is constituted by the bracket 11 and the stiffener 12.

Figure 2:
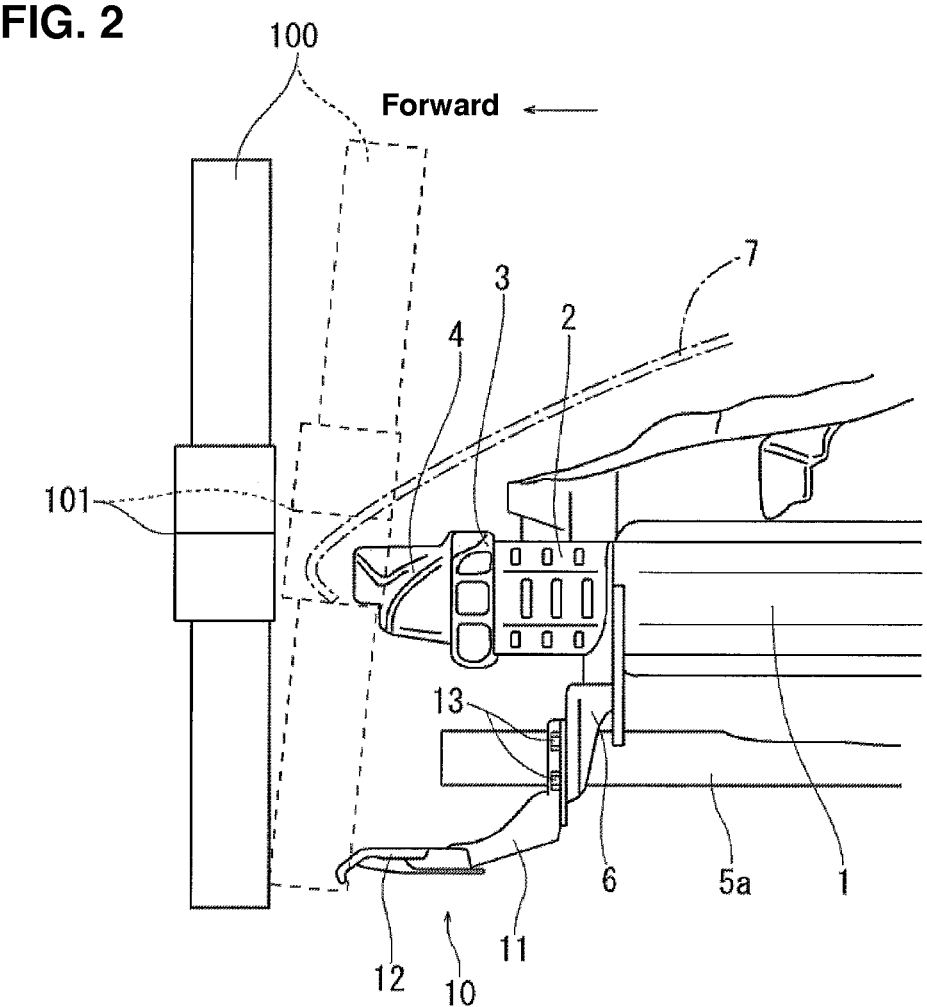
FIG. 2 is a side view showing a state in which a front portion of the vehicle shown in FIG. 1 collides with an obstacle configured to extend vertically.

A reference character 7 in FIG. 2 denotes an engine hood (bonnet) as a vehicle-body exterior member, and its front end is positioned right before the energy absorbing member 4. That is, the vehicle of the embodiment is designed such that the engine hood 7 is arranged at a considerably low level, specifically at the low level such that the height of the energy absorbing member 4 from the road surface is about 40-50 cm. Herein, the vehicle may be configured such that a front vehicle-body exterior member which is continuous flatly from a front end of the engine hood 7 is provided additionally and this front vehicle-body exterior member is positioned right before the energy absorbing member 4. Of course, the vehicle may be also configured such that the front end of the engine hood 7 or the front end of the front vehicle-body exterior member is located at a higher level than the energy absorbing member 4. Of course, a space below the front end of the engine hood 7 is used as the space for the radiator opening.

Figure 3:
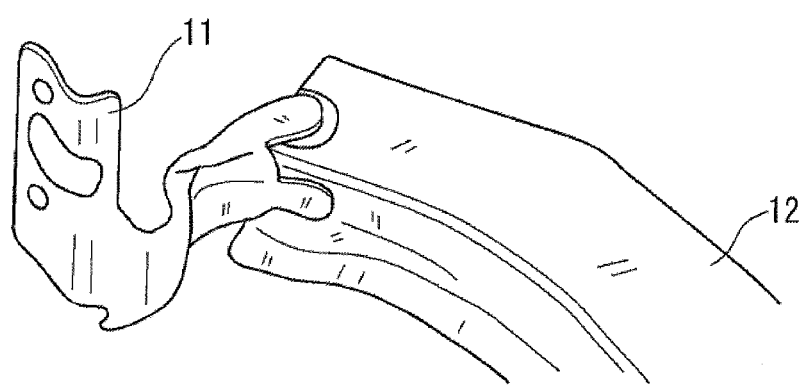
FIG. 3 is a perspective view showing an attachment example of a stiffener and a bracket.
Figure 6:
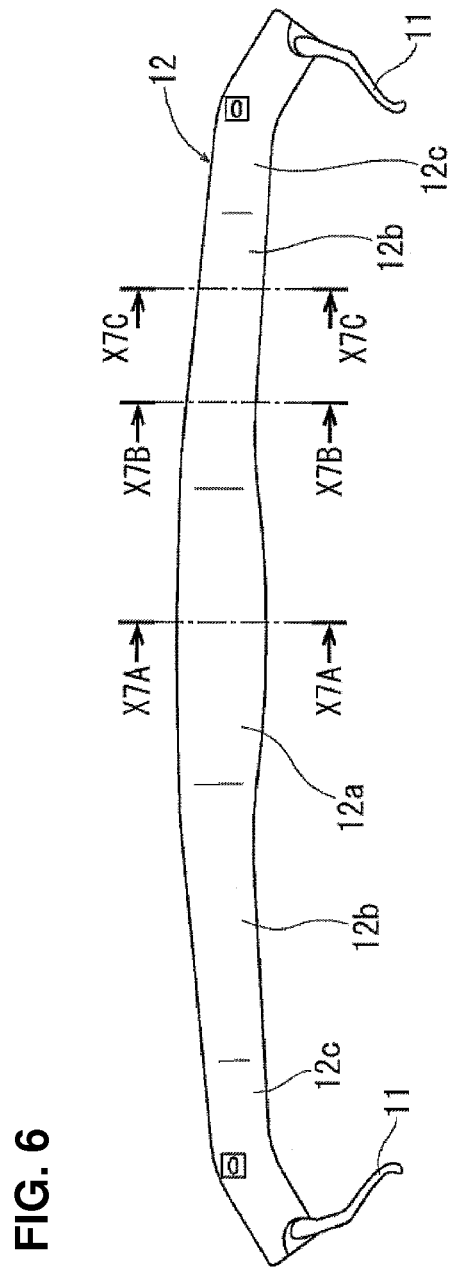
FIG. 6 is a plan view of the stiffener and the bracket, when viewed from above.

Next, the bracket 11 and the stiffener 12, as the protecting member 10, will be described referring to FIG. 2. Details of the bracket 11 and its connection portion to the stiffener 12 are shown in FIG. 3. The bracket 11 of the embodiment is configured to gradually extend forward and outward in the vehicle width direction (see FIG. 6).

The stiffener 12 extending in the vehicle width direction comprises an upper-side member 21 and a lower-side member 22 which are made of a plate member, respectively, and joined together to form the closed cross section thereof as shown in FIG. 7. That is, a front end portion of the lower-side member 22 is joined to the upper-side member 21 along a lower face of a front end portion of the upper-side member 21. A rear flange portion 21a extending rearward is formed at a rear end portion of the upper-side member 21, and a rear flange portion 22a extending rearward is formed at a rear end portion of the lower-side member 22. These two rear flange portions 21a, 22a are joined together by spot welding, for example. This joint portion of the rear flange portions 21a, 22a is configured to extend horizontally substantially straightly in a back view when viewed from the rear (see FIGS. 5 and 7). This substantially-straight-shaped joint portion is preferable in increasing the strength of the stiffener 12.

Figure 4:
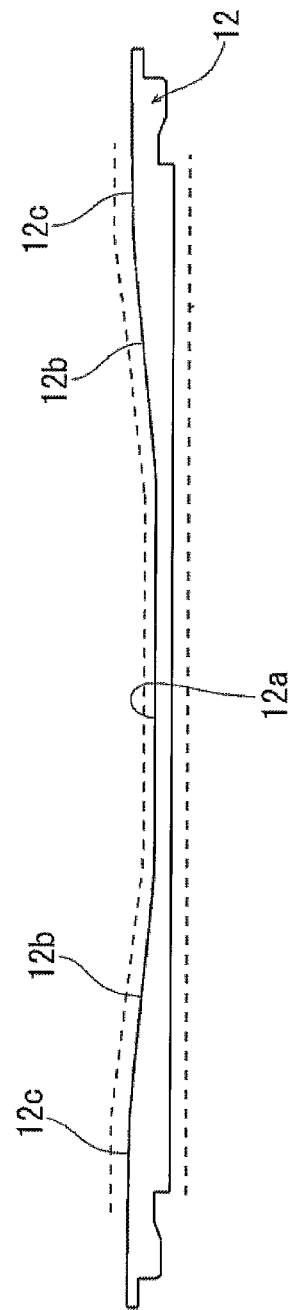
FIG. 4 is an elevational view of the stiffener, when viewed from the front.
Figure 5:
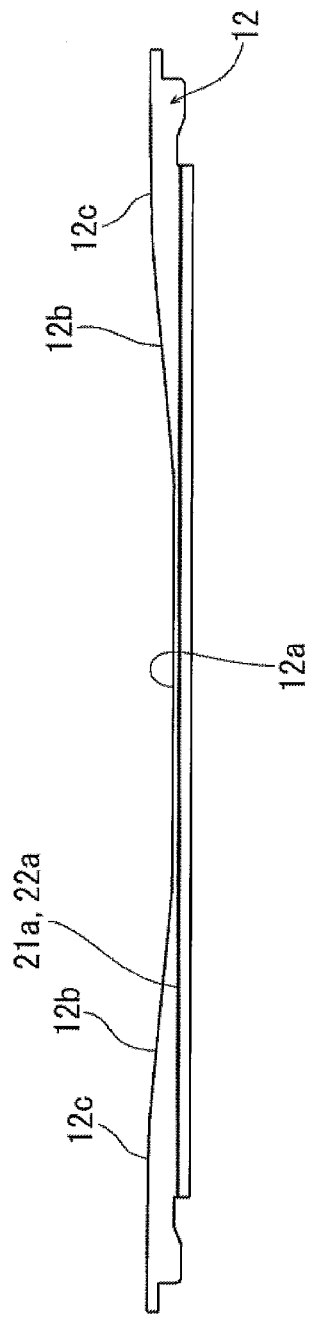
FIG. 5 is a back view of the stiffener, when viewed from the rear.

The stiffener 12 is, as shown in FIGS. 4 and 5, configured such that a central portion, in the vehicle width direction, of its upper face (the upper-side member 21) is concaved. This concaved portion is denoted by a reference character 12a. A slant portion 12b is formed at an outward portion of the upper face of the stiffener 12 relative to the concaved portion 12a. This slant portion 12b is configured to slant upward and outward gradually from an outward end of the concaved portion 12a. Further, an end horizontal portion 12c is formed at an outward portion of the upper face of the stiffener 12 relative to the slant portion 12b. This end horizontal portion 12c is configured o extend horizontally substantially straightly from an outward end of the slant portion 12b. A space in a vertical direction between the concaved portion 12a of the central portion of the stiffener 12 and the front end of the engine hood 7 becomes a space for ensuring the radiator opening, and the large opening area (especially, the sufficient height) of the radiator opening can be ensured by forming the above-described concaved portion 12a.

A lower face of the stiffener 12 is configured to extend horizontally substantially straightly as shown in FIG. 4 in particular. This substantially-straight configuration of the lower face is further preferable in ensuring the sufficient strength of the stiffener 12.

Since the upper face of the central portion, in the vehicle width direction, of the stiffener 12 has the concaved portion 12a and the lower face of the stiffener 12 is configured to extend horizontally substantially straightly, the distance between the upper face and the lower face is relatively small, compared with the other part of the stiffener 12. Accordingly, in order to ensure the sufficient strength of the central portion of the stiffener 12, the closed cross section of the central portion is configured such that its longitudinal width is large, particularly, relatively large, compared with any closed cross section of the other part of the stiffener 12 (see FIG. 7). In other words, the central portion with its closed cross section having the relatively small vertical width is configured to ensure substantially the same strength as the other part by enlarging the longitudinal width of the closed cross section thereof (which is preferable in making a deformation load which occurs in a vehicle collision at respective portions over the whole width, in the vehicle width direction, of the stiffener 12 be substantially constant). Herein, the area of the closed cross section extending in the vehicle width direction of the stiffener 12 is configured to be almost the same over a region from the central portion to the end portion, and also not to change largely.

Herein, while the protecting member 10 comprises the bracket 11 and the stiffener 12, it may be assumed that a pedestrian as the obstacle collides with this protecting member 10. In this case, the stiffener 12 hits against a leg portion of the pedestrian. In FIG. 2, a flex impacter which is assumed as the pedestrian's leg portion is denoted by a reference character 100, and a portion which corresponds to a knee joint of the leg portion is denoted by a reference character 101. As apparent from FIG. 2, the energy absorbing member 4 hits around the portion 101, and the stiffener 12 hits at a level (around an ankle) which is considerably lower than the portion 101.

Hereinafter, the protection function of the pedestrian by the brackets 11 and the stiffener 12 will be described in a case in which the vehicle collides with the pedestrian as the obstacle. First, in a first stage from a collision initial term, the stiffener 12 receives a collision load directly so that the increase rate of the deformation amount relative to the increase of the load can be relatively small (high rigidity). According to the load/deformation characteristics of this first sage, a situation in which the obstacle comes in below the vehicle-body front portion can be properly avoided.

In a second stage after the first stage, the increase rate of the deformation amount relative to the increase of the load becomes relatively large compared with the first stage (low rigidity). That is, since the front end portion of the stiffener 12 is configured to slant forward and downward, the stiffener 12 deforms, when receiving the collision load, in such a manner that it slants rearward and downward (i.e., in such a manner that the stiffener 12 changes its position toward a position in which the stiffener 12 aligns with the bracket 11 in a side view). Thereby, the energy absorption is performed so that the function of restraining partial deformation of the leg portion of the pedestrian as the obstacle can be obtained. Further, by configuring the bracket 11 such that its front portion extends outward gradually, the energy absorption in the second stage can be performed effectively.

In a third stage after the second stage, the increase rate of the deformation amount relative to the increase of the load becomes relatively small compared with the second stage (high rigidity). That is, while the stiffener 12 deforms so as to change its position toward the position in which the stiffener 12 aligns with the bracket 11 in the second stage as described above, the stiffener 12 finally comes to align with the bracket 11. Accordingly, the bracket 11 can generate a properly-large resistance against the deformation, in cooperation with the set plate 6, so that the increase rate of the deformation amount relative to the increase of the load becomes small. Herein, the embodiment is configured such that the third stage has the smallest increase rate of the deformation amount relative to the increase of the load among the first through third stages. The pedestrian as the obstacle can be flicked up forward of the vehicle body with the load/deformation characteristics of the third stage. In this case, the pedestrian is flicked up onto the engine hood 7 with a support point of a lower leg portion of the pedestrian which is positioned around the energy absorbing member 4. This is considerably preferable to the safety of the pedestrian. Herein, the above-described load/deformation characteristics is merely one example and preferably changeable.

The present invention should not be limited to the above-described embodiment, and any other modifications or improvements may be applied within the scope of a sprit of the present invention. While the stiffener 12 comprises the two plate members of the upper-side member 21 and the lower-side member 22, it may be comprised of a single plate member which is formed to have a closed cross section through a bending process. The bracket 11 and the set plate 6 may be formed integrally. Further, the bracket 11 and the set plate 6 may be comprised of three or more members as a sprit structure. Moreover, the bracket 11 itself may be comprised of two or more members as a sprit structure. The bracket 11 (the set plate 6) may be attached to either one of the side frame 1 and the suspension cross member 5 instead of being attached to the both.

What is claimed is:

1. A front vehicle-body structure of a vehicle, comprising:
a pair of right-and-left side frames extending longitudinally at a front portion of a vehicle body;
a bumper beam extending in a vehicle width direction and attached to front ends of the pair of right-and-left side frames;
a pair of right-and-left brackets attached to the pair of right-and-left side frames or a suspension cross member attached to the pair of right-and-left side frames and extending obliquely downward and forward; and
a stiffener extending in the vehicle width direction, arranged below the bumper beam, and attached to front ends of the pair of right-and-left brackets, wherein said stiffener has a closed cross section extending in the vehicle width direction substantially over an whole length thereof and is configured in an elevational view such that an upper face of a central portion thereof in the vehicle width direction is concaved and a lower face thereof extends horizontally substantially straightly, and said central portion, in the vehicle width direction, of the stiffener is configured such that a distance between the upper face and the lower face thereof is smaller than a distance between the upper face and lower face of the other part of the stiffener and a longitudinal width thereof is larger than a longitudinal width of the other part of the stiffener.

2. The front vehicle-body structure of a vehicle of claim 1, wherein said stiffener comprises an upper-side member and a lower-side member which are joined together to form the closed cross section thereof, respective rear flange portions of said upper-side and lower-side members which are formed at respective rear portions of the upper-side and lower-side members and joined to each other, and a joint portion of said respective rear flange portions of the upper-side and lower-side members is configured in a back view to extend horizontally substantially straightly.

3. The front vehicle-body structure of a vehicle of claim 2, wherein said closed cross section of the stiffener is configured such that a longitudinal width of the central portion, in the vehicle width direction, of the stiffener is larger than that of the other part of the stiffener.

4. The front vehicle-body structure of a vehicle of claim 1, wherein said closed cross section of the stiffener is configured such that a longitudinal width of the central portion, in the vehicle width direction, of the stiffener is larger than that of the other part of the stiffener.

5. A front vehicle-body structure of a vehicle, comprising:
a pair of right-and-left side frames extending longitudinally at a front portion of a vehicle body;
a bumper beam extending in a vehicle width direction and attached to front ends of the pair of right-and-left side frames;
a pair of right-and-left brackets attached to the pair of right-and-left side frames or a suspension cross member attached to the pair of right-and-left side frames and extending obliquely downward and forward; and
a stiffener extending in the vehicle width direction, arranged below the bumper beam, and attached to front ends of the pair of right-and-left brackets,
wherein said stiffener has a closed cross section extending in the vehicle width direction substantially over an whole length thereof and is configured in an elevational view such that an upper face of a central portion thereof in the vehicle width direction is concaved and a lower face thereof extends horizontally substantially straightly, and
the stiffener comprises an upper-side member and a lower-side member which are joined together to form the closed cross section thereof, respective rear flange portions of said upper-side and lower-side members which are formed at respective rear portions of the upper-side and lower-side members and joined to each other, and a joint portion of said respective rear flange portions of the upper-side and lower-side members is configured in a back view to extend horizontally substantially straightly.

6. The front vehicle-body structure of a vehicle of claim 5, wherein said closed cross section of the stiffener is configured such that a longitudinal width of the central portion, in the vehicle width direction, of the stiffener is larger than that of the other part of the stiffener.

\* \* \* \* \*